United States Patent Office 3,084,068
Patented Apr. 2, 1963

3,084,068
PROCESS FOR ACRYLIC POLYMERIZATIONS
George E. Munn, Liftwood, Wilmington, Del., assignor to E. I. du Pont de Nemours and Company, Wilmington, Del., a corporation of Delaware
No Drawing. Filed Nov. 8, 1960, Ser. No. 67,881
4 Claims. (Cl. 117—76)

This invention relates to a process for polymerizing acrylic monomers, such as methacrylates, in the presence of a multi-component curing system. More particularly, the invention concerns the preparation of cured products from monomer-polymer sirups of methacrylic ester compositions in the presence of antimony trichloride, an organic peroxide, and a chain transfer agent, such as mercaptan.

An object of the present invention is to provide a process for preparing cured products from monomer-polymer sirups at rapid rates of cure. A further object is to provide monomer-polymer sirups containing specific ingredients which accelerate the cure. Another object is to provide a novel process for making laminates of fibrous materials and acrylic resins at increased rates of cure. Still another object is to provide stable and flowable sirups of monomer and polymer-containing methacrylic esters and a process for molding, polymerizing and cross-linking the sirups in the presence of fibers to produce weather-resistant articles. Other objects and advantages of the invention will appear hereinafter.

The monomer-polymer sirups employed in the practice of this invention contain at least 5%, and preferably not more than 50%, by weight of polymeric methyl methacrylate or a copolymer containing methyl methacrylate as the principal component (the other component being methacrylic acid or a hydroxyalkane or hydroxyalkene ester thereof) in monomeric methyl methacrylate. The sirups also contain about 0.01 to 1% by weight of a mercaptan, such as an alkyl mercaptan or a hydroxy alkane or hydroxy alkene ester of mercapto acetic acid. The sirups also contain an antimony chloride suitably in quantities ranging from 5 to 10,000 parts per million, preferably 15 to 250 parts per million. In particular embodiments, the sirups contain copper in soluble form in quantity of from 0.005 to 3.0 parts per million.

A sirup of the kind hereinabove described can be mixed with or absorbed by fibrous materials and thereafter molded, polymerized, and cured to give weather-resistant articles. If desired, antimony trichloride can be applied to the surface of the fibrous material, in which event it need not be included in the sirup prior to contact with the fibrous material. An advantage of the latter technique resides in the longer pot life of the sirup. Another important advantage is the resultant increase in the pot life of any recovered excess of sirup which is drained or otherwise removed from the fibrous material in a form which is relatively free of the antimony trichloride which would otherwise be present in recycled excess sirup.

The sirups employed in the practice of the invention should be flowable enough to permit easy use. The ratio of polymer to monomer should be such as to provide a minimum of shrinkage and a minimum of exothermic heat of polymerization consistant with good physical properties of laminated products. Moreover, when the monomer content of the sirup is low, the sirup can be polymerized to a product having superior wettability, and the herein-disclosed ingredients make it possible to complete the polymerization at a high reaction rate.

The antimony chlorides which are used as curing aids in the practice of the invention are any of the following: $SbCl_3$, $SbOCl$, and $SbCl_5$. The soluble copper compounds can be any copper salt which is soluble in the sirup.

The quantity of mercaptan should preferably be such that it does not appreciably inhibit the polymerization during the stage of the process when the sirup is polymerized to a resin containing a minimal quantity of monomer which can be achieved in a short time, e.g. not longer than about 10 minutes.

The curing agent is preferably added to the sirup just prior to final polymerization. Suitable curing agents (initiators) include hydrogen peroxide, organic hydroperoxides and the like, the preferred initiators being tertiary alkyl hydroperoxides (such as tertiary butyl hydroperoxide, p-menthane hydroperoxide and cumene hydroperoxide), tertiary butyl peresters, such as peracetates and perbenzoates, and methyl ethyl ketone peroxide. In general, the organic curing agents are tertiary peresters or tertiary hydroperoxides, i.e. peroxy compounds having a tertiary carbon atom directly united to a —OO acyl or —OOH group. Mixtures of these peroxides with other peroxides may be used, if desired.

The monomer-polymer mixtures employed in the practice of the invention are preferably sirups having a bulk viscosity in the range of 0.5 to 50 poises, and contain methyl methacrylate polymer having an inherent viscosity of 0.25 to 1.0, preferably 0.3 to 0.55. The inherent viscosity is determined at 20° C. in chloroform solution at a concentration of 0.50 gram/100 ml., according to the method described in Text Book of Polymer Chemistry by F. W. Billmeyer, Interscience, Inc. (1957), page 128. Suitable sirups are those described in the patent application of G. E. Munn, Serial No. 773,762, filed November 13, 1958. An example illustrating the preparation of such a sirup is the following.

METHOD A

A solution containing 3.3 parts by weight of glycol dimercaptoacetate and 1000 parts of methyl methacrylate monomer was heated to 80° C., at which temperature a mixture of 0.3 part alpha, alpha', azo-bis-isobutyronitrile dissolved in 5.0 parts of methyl methacrylate monomer, was added. The resulting composition was heated in a vessel equipped with a reflux condenser, the temperature of the vessel contents being maintained at 100°–103° C. When the viscosity of the mixture reached 10 poises (measured at 25° C.), the polymerization was stopped by cooling the solution to 25° C., and adding 0.038 part of hydroquinone per 80 parts of methyl methacrylate monomer. The total reaction time was about 40 minutes. The resulting sirup had a polymer content of about 31% and an inherent viscosity of 0.37. It did not undergo any color change or viscosity change upon being stored at room temperature for 30 days.

If desired, the sirup can be prepared by dissolving a similar amount of polymer having the prescribed inherent viscosity in the monomer. However, formation of the sirup by partial polymerization of monomer is the preferred method. As hereinabove noted, the mercaptan is present during polymerization of the methyl methacrylate when the sirup is made by the latter method. In order to restrict the polymerization of the monomer during the preparation of the sirup, it is desirable to introduce only sufficient polymerization initiator to produce the desired amount of polymer since, in this way, optimum storage stability is obtained. Any of the well-known polymerization initiators may be employed in preparing the sirup. The quantity of initiator is from 50 to 5000 parts per million during the sirup preparation stage, preferably from 100 to 500 parts per million (based upon the weight of the monomer-polymer mixture).

The amount of polymer which is present in the monomer-polymer mixture is preferably controlled to meet the requirements of the particular use to which the sirup will be applied during the final curing. For example, when laminated articles containing fibers, fillers, or the like are to be made, the viscosity at 25° C. should preferably be about 2 to 20 poises, and in general, not greater than 50 poises. In general, these low viscosity sirups can be prepared by the method hereinabove described or by admixing low viscosity polymer with a sufficient amount of monomer. A higher proportion of monomer can be used to obtain the same bulk viscosity if the inherent viscosity of the polymer is relatively high.

When the sirup is prepared by partial polymerization, the temperature of the reaction mixture should be maintained between 50° and 150° C., preferably 95° to 105° C.

It is, of course, not essential that the sirups, which are to be employed in the practice of the invention have a long shelf life stability, since in particular embodiments the sirups may be employed immediately after they have been prepared. The mercaptans do not materially influence the degree of stability of the sirup.

The quantity of peroxide curing agent which is present during the final cure should be within the range of about 0.01 to 2.0% based on the weight of the sirup. The final cure is accomplished by heating the mixture at a temperature high enough to produce rapid reaction but not so high as to produce blemishes, such as bubbles, flow lines, etc. When conditions are such that the rate of heat transfer is low, the monomer content should be kept comparatively low since this results in low exothermicity during the shaping and final polymerizations.

In one of the most important embodiments of the invention, the sirup is impregnated in glass fiber mat which is coated with antimony trichloride. When this is done, any excess quantity of sirup or drainage thereof can be removed from the resultant mat, and it is surprisingly found that the excess liquid thus recovered is sufficiently stable to permit storage and reuse for impregnation of a further quantity of antimony trichloride-coated glass fiber mat.

During the final cure, the polymerization mixture can be shaped in any desired manner. For example, castings can be prepared by curing out the final polymerization in a mold or other confined space. Similarly, shaped articles can be made from laminated compositions, especially those containing glass fibers. A suitable temperature for the final curing reaction is within the range of about 20° to 150° C. In some instances, evaporation of the monomer can accomplish the final curing reaction. However, the tendency of the monomer to volatilize is greatly reduced by the presence of the polymer and because the monomer is so rapidly converted to polymer when the initiator systems herein-described are used.

It is quite surprising that the antimony chloride produces gelation in the presence of the other ingredients at a rapid rate. In fact, rates comparable with those which are realized by employing a sulfone as a co-catalyst, as described in U.S. Patent 2,776,952 by Bredereck and Wohnhas, are obtained.

In the examples which follow, it is to be understood that the gel times represent measurements which reflect the utility of the compositions in the manufacture of shaped articles at rapid rates of cure. In general, from a practical standpoint, it is desirable to employ in the manufacture of useful objects reaction times somewhat longer than the gel times reported in the examples. In all instances, a reaction time which is twice as long as the gel time is entirely adequate in the manufacture of useful objects, such as moldings, sheeting, etc. The gel time can be defined as the time required to produce a rapidly changing viscosity in the range of 200 to 300 poises. Any suitable instrument, such as a calibrated rotating glass bar in a vessel containing the sirup can be used for determining gel times. A gel time meter manufactured by the Sunshine Scientific Instrument Company of Philadelphia, Pennsylvania, was used for the examples shown in the accompanying tables.

One of the remarkable advantages of the compositions described in the examples given below is the resistance to yellowing during outdoor exposure. This can be measured by means of weatherometer tests performed on castings. For example, when a film 80 mils thick was cured by means of an initiator system containing 0.5% lauroyl peroxide, 0.1% tertiary butyl hydroperoxide, 150 parts per million $SbCl_3$, and 8 parts per million of copper naphthenate, the remainder being methyl methacrylate monomer-polymer sirup, the development of yellowness was slow enough so as not to detract from the utility of the final composition. The initial yellowness number was 0.72; after 500 hours, the yellowness number had increased by 2.01; and after a further 500 hours, the yellowness number had increased by 2.8. In these tests, the yellowness number is defined as the intensity of red minus the intensity of blue × 100 divided by the intensity of green. The colors are measured on a color master differential colorimeter produced by the Manufacturers Engineering and Color Company, Hatboro, Pennsylvania.

The invention is illustrated further by means of the following examples.

EXAMPLE 1

In a series of runs employing methyl methacrylate monomer-polymer sirup prepared in accordance with "Method A" the composition of the initiator system was varied as described in the following table. The gel times were measured at 40° C. As will be seen from the table these gel times were of short duration as compared with the gel time of the control composition.

*Table*

TIME REQUIRED TO CAUSE FINAL CURE OF ACRYLIC COMPOSITIONS

| tBHPO, percent | $SbCl_3$, percent | CuNap, p.p.m. | 40° C. gel time, min. | Remarks |
|---|---|---|---|---|
| 0.10 | 0 | 10 | (¹) | Control. |
| 0.10 | 0.008 | 0 | 41.5 | |
| 0.10 | 0.012 | 0 | 39.0 | |
| 0.10 | 0.024 | 0 | 50.2 | |
| 0.10 | 0.100 | 0 | 67.1 | |
| 0.10 | 0.012 | 1 | 21.1 | |
| 0.10 | 0.012 | 2 | 18.8 | |
| 0.10 | 0.012 | 5 | 18.1 | |
| 0.10 | 0.012 | 10 | 16.7 | |
| 0.10 | 0.012 | 20 | 17.1 | |
| 0.10 | 0.100 | 10 | 16.0 | |
| 0.10 | 0.012 | 0 | 16.9 | 3 p.p.m. $CuCl_2 \cdot 2H_2O$ used. |

| | $SbCl_5$, percent | | | |
|---|---|---|---|---|
| 0.10 | 0.0135 | 0 | 72.9 | |
| 0.10 | 0.0135 | 1 | 29.2 | |
| 0.10 | 0.0135 | 2 | 21.3 | |
| 0.10 | 0.0135 | 5 | 14.2 | |
| 0.10 | 0.0135 | 10 | 14.8 | |
| 0.10 | 0.0135 | 20 | 15.3 | |
| 0.10 | 0.0270 | 10 | 15.8 | |

| DDM, percent | $SbCl_3$, percent | | | |
|---|---|---|---|---|
| 0.10 | 0.008 | 0 | 32.8 | |
| 0.10 | 0.012 | 0 | 34.2 | |
| 0.10 | 0.024 | 0 | 38.4 | |
| 0.10 | 0.100 | 0 | 57.2 | |

| "Lupersol" DDM, percent | | | | |
|---|---|---|---|---|
| 0.10 | None | 10 | (²) | Control. |
| 0.10 | 0.012 | 10 | 23.0 | |
| 0.10 | 0.012 | 5 | 22.3 | |
| 0.10 | 0.004 | None | 38.6 | |
| 0.10 | 0.004 | 10 | 29.0 | |
| 0.10 | 0.024 | 10 | 20.0 | |
| 0.10 | 0.100 | 10 | 25.5 | |

Footnotes at end of table.

Table—Continued

| "Lupersol" Delta, percent | SbCl₃, percent | CuNap, p.p.m. | 40° C. gel time, min. | Remarks |
|---|---|---|---|---|
| 0.10 | 0.012 | 10 | 21.5 | |

| "Lupersol" DDM, percent | SbCl₅, percent | | | |
|---|---|---|---|---|
| 0.10 | 0.0135 | None | 57.8 | |
| 0.10 | 0.0135 | 10 | 18.6 | |
| 0.10 | 0.027 | None | 58.7 | |
| 0.10 | 0.027 | 10 | 25.1 | |
| 0.10 | 0.009 | None | 54.3 | |
| 0.10 | 0.009 | 10 | 18.1 | |

| "Lupersol" 7, percent | SbCl₃, percent | | | |
|---|---|---|---|---|
| 0.25 | None | 10 | (³) | Control. |
| 0.25 | 0.012 | 10 | 7.7 | |
| 0.25 | 0.012 | None | 33.4 | |

| t-Butyl perbenzoate, percent | | | | |
|---|---|---|---|---|
| 0.25 | None | 10 | (³) | Control. |
| 0.25 | 0.012 | 10 | 7.0 | |
| 0.25 | 0.012 | None | 26.6 | |

| Hydrogen peroxide, percent | | | | |
|---|---|---|---|---|
| 0.06 | 0.02 | 0 | 45 | |
| 0.06 | 0.02 | 10 | 18.8 | |

¹ Over 24 hours. ² Over 1,000 minutes. ³ Over 175 minutes.
NOTE.—"Lupersol" DDM and "Lupersol" Delta are both commercial preparations of methyl ethyl ketone peroxide. "Lupersol" 7 is a commercial preparation of t-butyl peracetate. The hydrogen perioxide was used in the form of a 30% aqueous solution. The copper naphthenate used contained 10% by weight of copper.
Abbreviations: tBHPO=t-Butyl Hydroperoxide. CuNap=Copper Naphthenate. DDM="Lupersol" DDM, a commercial preparation of methyl ethyl ketone peroxide.

EXAMPLE 2

A glass fiber mat was soaked with an equal weight of methanol containing 0.1% by weight of SbCl₃, following which the methanol was removed by vaporization. The resulting dry mat was impregnated with three times its weight of monomer-polymer methyl methacrylate sirup, prepared in accordance with "Method A," to which 0.5% by weight of lauroyl peroxide, 0.1% of tertiary butyl hydroperoxide and 10 parts per million of copper naphthenate were added. The composition was placed in a cellophane envelope, and 10% of the sirup was recovered in a form suitable for use in impregnating additional glass fiber. This sirup, unretained by the mat, was kept for five hours without any apparent change, at room temperature. In comparison, a similar sirup in which the antimony trichloride was present without having been introduced as a coating on glass fiber, underwent exothermic polymerization on standing at room temperature for one hour. The mixture remaining in the cellophane envelope was pressed gently (about ¹⁄₁₀ pound per square inch) to produce a sheet ¹⁄₁₆ inch thick. This was cured by heating in an oven at 127° to 131° F. for 30 minutes. The resulting sheet, when cooled and separated from the cellophane, was tough, strong, and colorless (as it appeared to the naked eye).

It is to be understood that the foregoing examples are intended to illustrate the operability of the invention and that other embodiments will be apparent to those who are skilled in the art. The invention can be used in the production of large corrugated sheets for construction purposes, smaller sheets for glazing especially in greenhouses and the like, tubing, containers, bottles, complex shapes including decorative objects, etc. It is also to be understood that ethyl acrylate, cyclohexyl methacrylate, etc. can be used in place of at least a part of the methyl methacrylate monomer or polymer. The glass fiber reinforcement can be replaced in whole or in part by fillers such as titania, silica, carbon black, polyolefin fibers, powdered metals or any other filler suitable for use in acrylic resins. Suitable dyes, pigments, may, of course, also be added, if desired.

I claim:
1. A process for preparing polymerizates from methyl methacrylate monomer-polymer mixture which comprises maintaining said mixture at a temperature of 20° to 65° C. in the presence of an initiator system consisting essentially of 0.01 to 1.0% by weight of a mercaptan, 5 to 10,000 parts per million of an antimony chloride, 0.005 to 3.0 parts per million of copper in dissolved form, and 0.01 to 2.0% of a curing agent of the class consisting of hydrogen peroxide, methyl ethyl ketone peroxide tertiary peresters and tertiary hydroperoxides, whereby a conversion to a polymerizate occurs.

2. Process of claim 1 wherein the antimony chloride is SbCl₃.

3. Process of claim 2 wherein the SbCl₃ is introduced in the form of a coating on glass fiber mat.

4. A process which comprises impregnating a glass fiber mat with a methyl methacrylate monomer-polymer sirup, containing from 5 to 50% by weight of methyl methacrylate polymer and complementally from 95 to 50% by weight of methyl methacrylate, said sirup having a bulk viscosity in the range of 0.5 to 50 poises, and containing methyl methacrylate polymer having an inherent viscosity of 0.25 to 1.0, said sirup having admixed therein 0.01 to 1.0% by weight of a mercaptan, 0.005 to 3.0 parts per million of copper in dissolved form, and 0.01 to 2.0% of a curing agent of the class consisting of hydrogen peroxide, methyl ethyl ketone peroxide tertiary peresters and tertiary hydroperoxides, said glass fiber mat having SbCl₃ coated thereon in quantity of 15 to 250 parts per million parts of said sirup, and removing from the resultant mat, the excess of impregnating liquid, which is unretained by the mat, said excess liquid being sufficiently stable to be thus recovered, and re-used for the impregnation of a further quantity of SbCl₃-coated glass fiber mat.

References Cited in the file of this patent

UNITED STATES PATENTS

| | | |
|---|---|---|
| 2,143,941 | Crawford | Jan. 17, 1939 |
| 2,406,412 | Speakman et al. | Aug. 27, 1946 |
| 2,632,758 | Brothman | Mar. 24, 1953 |
| 2,642,410 | Hoppens | June 16, 1953 |
| 2,684,305 | Quinlivan | July 20, 1954 |
| 2,744,886 | Protzman | May 8, 1956 |
| 2,939,761 | Stein | June 7, 1960 |

FOREIGN PATENTS

| | | |
|---|---|---|
| 582,010 | Great Britain | Nov. 1, 1946 |
| 752,269 | Great Britain | July 11, 1956 |